United States Patent [19]
Modafferi et al.

[11] Patent Number: 4,836,750
[45] Date of Patent: Jun. 6, 1989

[54] ROTOR ASSEMBLY

[75] Inventors: Mario Modafferi; Paul A. Juneau, both of St. Leonard, Canada

[73] Assignee: Pratt & Whitney Canada Inc., Quebec, Canada

[21] Appl. No.: 206,785

[22] Filed: Jun. 15, 1988

[51] Int. Cl.$^4$ .................. F01D 5/00; F16B 4/00
[52] U.S. Cl. .................. 416/244 A; 416/204 A; 416/204 R; 416/244 R; 403/28; 403/29
[58] Field of Search .......... 416/244 A, 244 R, 204 A, 416/204 R; 403/28, 29, 30

[56] References Cited

U.S. PATENT DOCUMENTS

| | | | |
|---|---|---|---|
| 3,019,039 | 1/1962 | Clavell | 416/244 A |
| 3,077,811 | 2/1963 | Moore | 85/8.6 |
| 3,644,058 | 2/1972 | Barnabei et al. | 416/95 |
| 3,666,302 | 5/1972 | Kellett | 416/244 A |
| 3,689,177 | 9/1972 | Klassen | 416/198 |
| 3,713,676 | 1/1973 | Carlstrom et al. | 416/244 A |
| 3,768,924 | 10/1973 | Corsmeier et al. | 416/95 |
| 4,118,847 | 10/1978 | Mansson et al. | 29/156.8 R |
| 4,171,930 | 10/1979 | Brisken et al. | 416/220 R |
| 4,304,523 | 12/1981 | Corsmeier et al. | 416/221 |
| 4,470,756 | 9/1984 | Rigo et al. | 416/220 R |
| 4,483,661 | 11/1984 | Manharth et al. | 416/220 R |
| 4,518,315 | 5/1985 | Krüger | 416/244 A |
| 4,589,176 | 5/1986 | Rosman et al. | 416/229 A |
| 4,604,033 | 8/1986 | Surdi | 416/220 R |
| 4,737,076 | 4/1988 | Bonner et al. | 416/198 A |

OTHER PUBLICATIONS

Perry, R. H., Chilton, C. H., *Chemical Engineers' Handbook*, 5th Edition, 1973, pp. 23-38.

*Primary Examiner*—Robert E. Garrett
*Assistant Examiner*—Michael V. Readey
*Attorney, Agent, or Firm*—Troxell K. Snyder

[57] ABSTRACT

A gas turbine engine rotor (18) and shaft (28) are secured against radial loosening between the shaft (28) and axially spaced rotor spigots (24, 26) by annular spacer rings (42, 43) which are fabricated from a material having a thermal coefficient of expansion significantly higher or lower than the thermal coefficients of the shaft (28) or rotor (18). The ring (42, 43) is pre-assembled during production of the engine in an interference fit with either the rotor hub (22) or the shaft (28), being sized to remain tight with the pre-assembled member over a range of operating temperatures, and becoming more tightly fit with the other member due to differential thermal expansion therebetween.

6 Claims, 2 Drawing Sheets

ROTOR ASSEMBLY

This invention was made under a U.S. Government contract and the Government has rights herein.

FIELD OF THE INVENTION

The present invention relates to a means for securing a rotor to a shaft.

BACKGROUND ART

Means for securing a driving or driven rotor to a power transmitting shaft are well known in the art of rotating machinery. Such rotors must typically be secured against relative radial, axial, and rotational motion with regard to the shaft and, for certain applications, must further be adapted for disassembly for maintenance or other purposes. One particularly demanding application is the rotor assembly of a gas turbine engine subjected not only to extremely high angular speed, on the order of 20–30,000 rpm, but also to a variation of temperature over the range from ambient up to the working fluid temperature, approximately 2500° F. (1375° C.) or higher.

The attachment of a rotor to a shaft in a gas turbine engine, while located in a relatively cool portion of the engine with respect to the working fluid temperature, nonetheless may reach temperatures up to 500° F. (260° C.) which results in significant thermal expansion of the shaft and rotor components. The radially inner portion of the rotor, termed the hub, is typically sized to fit closely about the power transmitting shaft and further typically includes means, such as a spline, keyway, or the like, for preventing relative rotation between the assembled shaft and rotor. As will be appreciated by those skilled in the art, operation of the rotor assembly at high angular speed induces radial tensile stress in the radially outer or disk portion of the rotor. Such radial tensile stress tends to result in radial expansion of the hub portion of the rotor, opening the radial fit between the rotor hub and the shaft.

Such opening is prevented in the prior art by sizing the outer diameter of the shaft and the corresponding inner diameter of the hub so as to result in a radial interference fit between the assembled components. The use of an interference fit, if properly sized, results in the maintenance of full contact between the rotor hub and the shaft over the entire operating range of the assembly.

Another factor which can cause loosening of the radial fit between the rotor hub and shaft can result from a mismatch of the thermal coefficients of expansion of the rotor material and the shaft material. For rotors of gas turbine engines, the typical material of manufacture is a high strength, temperature resistant nickel-based alloy, such as Waspalloy (a trademark of United Technologies Corporation), which is particularly adapted to withstand the high temperature present in the radially outward fluid path as well as being sufficiently strong at the hub portion to accommodate the high stresses induced by high speed rotation.

Such material, having a thermal coefficient of expansion or alpha equal to $7.35 \times 10^{-6}$ at 500° F., may be contrasted with the coefficient of expansion of a carbon steel shaft, $7.15 \times 10^{-6}$ at 500° F. Carbon steel, AMS6304 or equivalent, is typically selected for the shaft material based on machinability and cost considerations. As will be apparent to those skilled in the art, the rotor expands at a higher rate than the shaft for an equivalent temperature increase, thereby further increasing the radial dimension of the inner diameter of the hub relative to the outer diameter of the shaft.

The combination of the "thermal loosening" and "rotational loosening" as described above must be considered in determining the ambient temperature, non-rotating radial interference fit between the rotor hub and the shaft. The magnitude of this radial interference fit, as well as the degree of difficulty in assembling and disassembling the rotor and shaft both increase as the engine and rotor are designed to operate at increased temperatures and angular speeds. Assembly/disassembly is further complicated by the need to size both the shaft and rotor to accommodate diametral machining tolerances on the order of ±0.002 inches (0.004 mm) to insure that all rotors and shafts of an engine production run will each have at least the minimum cold static interference fit necessary to insure that the assembly will not experience any loss of fit at operating temperatures and speed.

As noted above, assembly can become complicated, particularly in high performance engines which operate at elevated temperatures and/or angular speeds. Such assembly may be accommodated in the production facility by well-known methods of reducing the necessary axial assembly/disassembly force, such as by chilling the shaft and heating the rotor to reduce or eliminate the interference fit during assembly. Such controlled temperatures, as well as the necessary hydraulic and/or mechanical equipment to overcome the interference fit while axially pressing the rotor onto the shaft are frequently not available at remotely located repair facilities, especially field maintenance stations. In such remote locations it is highly desirable to have the ability to assemble/disassemble a rotor assembly using common handtools. Such manual tools presently used are unable to exert the required axial force between the rotor and shaft to overcome the cold static interference fit in a high performance engine, thereby severely compromising the field maintainability of such engines. What is required is a means for securing a rotor to the shaft of a high performance gas turbine engine, or the like, which does not require complicated procedures or machinery to secure or release the rotor and shaft.

SUMMARY OF THE INVENTION

It is therefore an object of the present invention to provide a means for firmly securing a rotor to a shaft.

It is further an object of the present invention to provide a securing means adapted to accommodate differential radial expansion between a hub portion of the rotor and the shaft resulting from rotationally induced stresses and/or differential thermal expansion.

It is further an object of the present invention to provide a securing means which does not require high axial force or differential temperature methods for assembly and disassembly of the rotor and shaft.

According to the present invention, a rotor and shaft having substantially similar thermal coefficients of expansion are assembled and secured against relative radial loosening over a range of angular speeds and operating temperatures. The present invention provides an annular spacer ring, disposed radially between a hub portion of the rotor and the shaft and being fabricated from a material having a thermal coefficient of expansion which is either significantly higher or significantly lower than the thermal coefficients of expansion of both the shaft and the rotor.

During operation of the assembled rotor and shaft at high angular speeds and elevated temperatures, the interaction between the spacer ring and the rotor and shaft maintains a close radial fit between the components despite differential radial displacement resulting from the radial tensile stress induced by the rotation of the rotor disk as well as differential thermal growth between the rotor hub and shaft which may result from even a small mismatch of the thermal coefficients of expansion of the rotor and shaft.

In the embodiment of the spacer ring according to the present invention which is fabricated from a high thermal expansion material, the spacer ring is assembled with an interference fit over the shaft in a high tension, radial compressive prestress state in the engine production facility, using any of the production assembly methods discussed in the preceding section. The rotor hub inner diameter is sized to slip relatively easily over the outer diameter of the first embodiment spacer ring at ambient temperature, thus allowing field disassembly of the rotor and shaft without complicated tooling.

During engine operation as the shaft and rotor approach operating temperature, the outer diameter of the spacer ring attempts to expand at a higher rate than the inner diameter of the rotor hub, thereby insuring a tight fit therebetween during engine operation. The original radial compressive prestress between the spacer ring and shaft is sized to maintain a sufficiently close radial fit over the entire engine operating range, thereby achieving the desired releasable rotor and shaft joint.

In the second embodiment of the spacer ring according to the present invention, the spacer ring is fabricated from a material having a significantly lower thermal coefficient of expansion as compared to both the rotor and shaft, and is likewise assembled in a prestressed condition in the production facility. In the second embodiment, however, the spacer ring is compressably prestressed by means of an interference fit between the outer diameter of the second embodiment spacer ring and the hub inner diameter. The spacer ring inner diameter is sized to slip relatively easily over the shaft at ambient temperature, thus providing the releasable joint required for field maintenance.

In a similar fashion to the first embodiment spacer ring, as the rotor and shaft assembly of the second embodiment are heated to operating temperature, the inner diameter of the spacer ring expands less than the outer diameter of the shaft, thereby maintaining a tight radial fit therebetween. As with the first embodiment, the degree of prestress provided between the rotor and second embodiment spacer ring is sufficient high so as to maintain a tight radial fit therebetween over the entire engine operating range.

The original prestressed interference fit between either the first embodiment spacer ring and the shaft or the second embodiment spacer ring and the rotor may be considered, from a field maintainability standpoint, to be a permanent joint formed between said components. Field assembly and disassembly of the rotor and shaft is accomplished by slipping the other component axially relative to the spacer ring at ambient temperature. Thus, the spacer ring according to the present invention provides a radial fit between a rotor and shaft which may be disassembled relatively easily at ambient temperature and which does not open radially as the temperature of the rotor and shaft assembly increases.

The present invention, by providing a properly sized and prestressed annular spacer ring, can thus accommodate not only the differential radial displacement caused by the high tensile stresses induced by high speed rotation of the rotor, but can further accommodate a relatively small thermal coefficient mismatch between the rotor hub and the shaft as can occur when materials such as Waspalloy and carbon steel are used for the rotor and shaft, respectively. The radial prestress, either compressive or tensile, required between the low thermal expansion or high thermal expansion embodiments of the spacer ring are achieved during the initial assembly of the engine in the manufacturing facility and hence may be accomplished through the use of local chilling or heating of the various components as well as with assembly machinery able to impart the high assembly force required. Once assembled in the prestress condition, the spacer ring is not removed during normal field maintenance from the corresponding rotor or shaft, staying fixed in position as the other component is slipped axially with relatively low force at ambient temperatures.

By reducing the requirement for radial prestress directly between the rotor and shaft, the spacer ring according to the present invention is well adapted to provide for assembly/disassembly of the rotor and shaft with a minimum of tools and equipment, such as in a remote field location or the like. Both these and other objects and advantages of the present invention will be apparent to those skilled in the art upon review of the following specification and the appended claims and drawing figures.

DETAILED DESCRIPTION OF THE INVENTION

Figure 1:
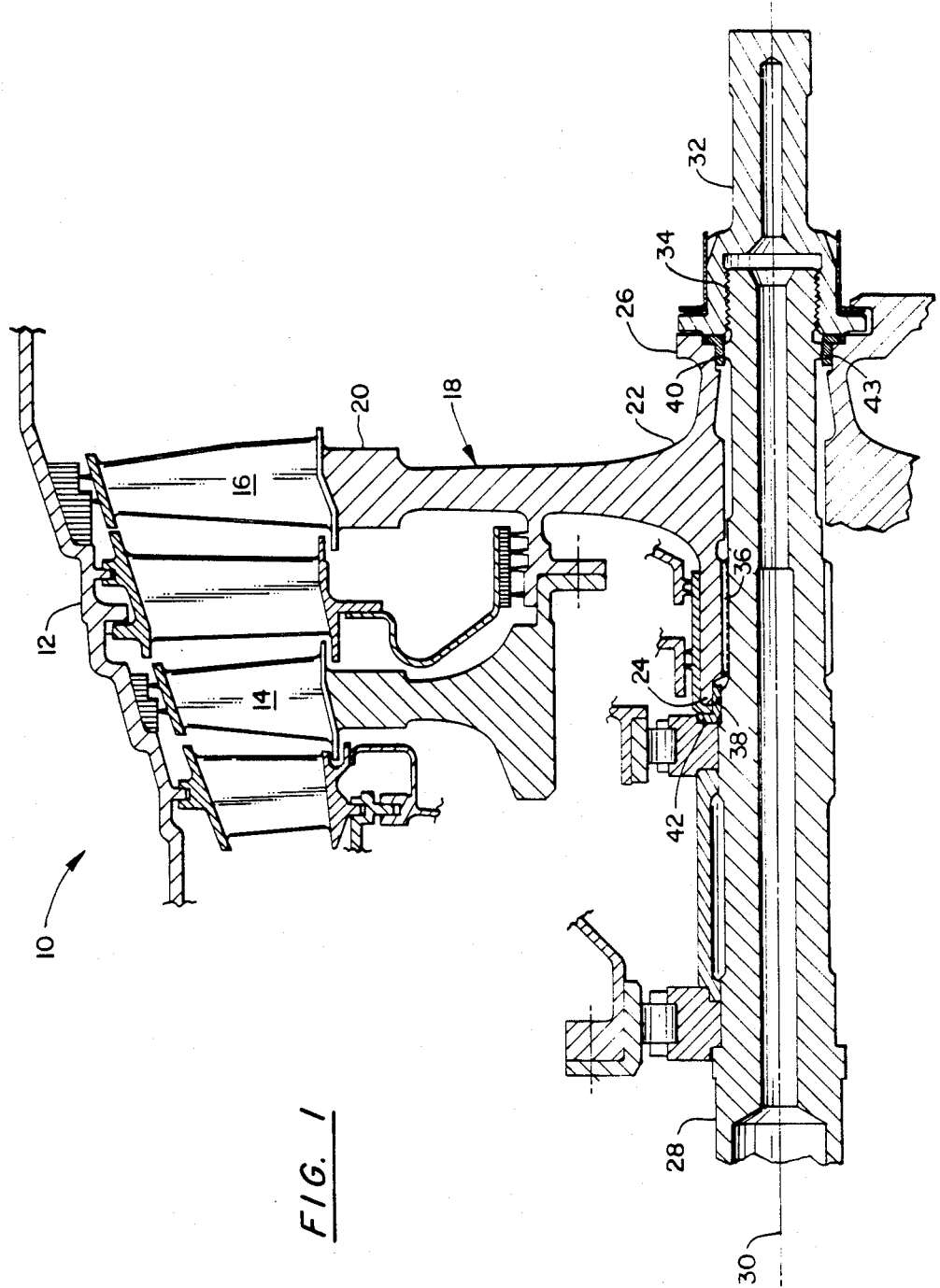
FIG. 1 shows a partial axial cross-section of the turbine section of a gas turbine engine including annular spacer rings according to the first and second embodiments of the present invention.
Figure 2:
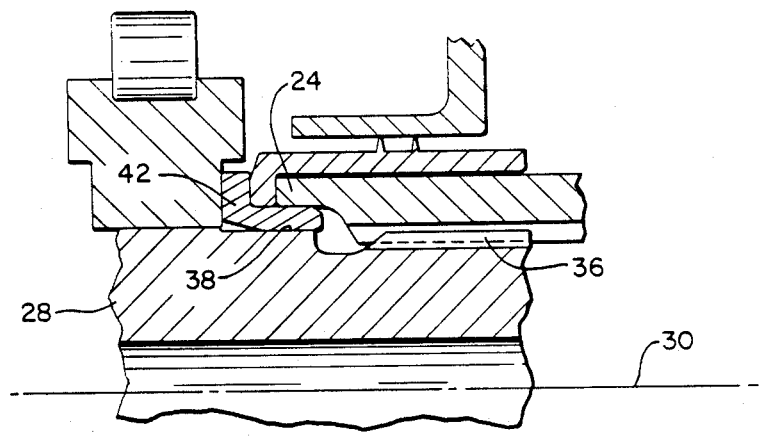
FIG. 2 shows a detailed view of the shaft, rotor, hub, and spacer ring according to the first embodiment of the present invention.

FIG. 1 shows an axial cross-section of a turbine section of a gas turbine engine. The turbine section 10 includes an outer case 12 defining an outer flow boundary for the working fluid, two stages of turbine blades 14, 16 secured to a rotor 18 which includes a radially outwardly disposed disk portion 20 and a radially inwardly disposed hub portion 22. As can be seen in FIG. 1, the hub portion 22 includes two spigot portions 24, 26 spaced axially from the disk portion 20. The rotor 18 is disposed concentrically about the central power shaft 28 of the turbine section 10, with the assembled rotor 18 and shaft 28 rotating about the shaft axis 30. The rotor 18 is secured to the shaft 28 against relative radial, axial, and rotational movement. Relative axial movement is prevented by the retaining nut 32 which is threadedly engaged with the shaft 28. Relative rotational movement is prevented by a plurality of axial splines 36 disposed in the shaft 28 and in the upstream spigot 24 of the rotor hub 22.

Relative radial movement of the rotor is controlled by closely fitting the axially spaced spigot portions 24, 26 of the rotor hub 22 with respect to corresponding portions 38, 40 of the shaft 28. The forward interface of the spigot 24 and the shaft 28 includes a spacer ring 42 according to the first embodiment of the present invention, while the aftward interface between the spigot 26 and shaft 28 includes an interposed spacer ring 43 according to the second embodiment of the present invention. As noted hereinabove, the radial tensile stresses induced by high speed rotation of the assembled rotor 18 and shaft 28, as well as differential thermal expansion which may result from differing thermal coefficients of the rotor and shaft materials, can result in a relative radial displacement between the corresponding local shaft portions 38, 40 and the inner diameters of the corresponding spigots 24, 26.

The spacer rings 42, 43 according to the present invention avoid this loosening with respect to one member by means of a radial interference fit resulting in a predetermined level of prestress between the spacer rings 42, 43 and the shaft 28 and rotor spigot 26, respectively. The radially opposite side of each spacer ring is maintained in tight radial fit with the adjacent member due to the differential thermal expansion resulting from the significantly higher or lower thermal expansion rate of the spacer rings 42, 43 as discussed hereinbelow.

With regard to the first embodiment ring 42 disposed radially within the first spigot 24 of the rotor hub 22, spacer ring 42 is assembled on the corresponding shaft portion 38 by means of an interference fit at the time of initial component assembly in the engine production facility. Spacer ring 42, fabricated of high expansion steel such as A-286 as designated by the American Society of Testing and Materials, is thus in a high tensile prestress condition with respect to the shaft portion 38. The outer diameter of the first spacer ring 42 is sized to fit closely with respect to the inner diameter of the first spigot 24, achieving a close fit or no more than a very slight interference fit at ambient temperature, thereby achieving a close radial fit which may be made without excessive axial force.

During operation of the engine at elevated temperatures and high rotor angular speed, the high expansion first spacer ring 42 attempts to expand radially as the component temperatures increase, thereby increasing the radial compressive fit between the spacer 42 and the spigot 24. As will be appreciated by those skilled in the art, the thermal expansion of the spacer 42 at a rate significantly greater than that of either the spigot 24 or the shaft 26 results in a reduction of the compressive stress between the ring 42 and shaft portion 38 as compared to the ambient assembled prestress level, however, as noted above, the assembled prestress is selected sufficiently high so as to avoid any loosening between these two members under expected engine operating conditions.

With regard to the second embodiment spacer ring 43 shown disposed between the second spigot 26 and a corresponding portion 40 on the shaft 28. Spacer ring 43 is sized to provide an interference fit between the inner diameter of the spigot 26 and the outer diameter of the ring 43 which is fitted during initial assembly of the engine components in a production facility. The inner diameter of the low expansion second spacer ring 43 is sized to fit closely or in slight interference with the shaft portion 40, thereby insuring a close fit at ambient temperatures without excessive axial assembly force. The second spacer ring 43, fabricated of a material having a low thermal coefficient of expansion relative to the spigot 26 and shaft 28 is comprised of a material such as titanium.

During operation of the engine, as the components 26, 43, 28 are heated to operating temperature, the diameter of the local portion 40 of the shaft 28 attempts to expand radially outward at a rate greater than the inner diameter of the spacer ring 43, thus increasing the radial compressive force therebetween and maintaining a tight radial fit. As will also be appreciated by those skilled in the art, the low thermal growth rate of the second spacer ring 43 relative to the rotor spigot 26, as well as the rotational tensile force induced in the rotor 18, cause a reduction in the compressive stress between the spigot 26 and the outer diameter of the spacer ring 43 as compared to the ambient, prestress level, but as also noted above, the initial assembly prestress is selected so as to prevent loosening between the spacer ring 43 and spigot 26 under expected engine operating conditions.

By interposing a spacer ring having a thermal coefficient of expansion significantly different than the rotor and shaft components, and by providing a significant prestress during the production assembly of the components between the spacer ring and one of the rotor and shaft members, the spacer rings 42, 43 according to the present invention provide a rotor and shaft assembly which maintains a tight radial fit under expected engine operating conditions without requiring excessive axial force to remove the rotor 18 from the shaft 28 under ambient temperature conditions.

As noted hereinabove, these features are particularly well adapted for gas turbine engines wherein such removal must be accomplished under field conditions with ordinary hand tools and without the sophisticated heating/cooling and other powerful assembly machinery available in an engine production or centralized maintenance facility. The spacer ring according to the invention is also disclosed in two embodiments, a high thermal expansion embodiment 42 and a low thermal expansion embodiment 43, each of which is equally useful in achieving the objects and advantages as set forth hereinabove. It is likely, however, that for such applications both embodiments will be required, as shown for example in the FIG. 1 arrangement wherein the upstream spigot 24 interfaces with a high expansion spacer ring 42 and the downstream spigot 26 incorporates a low expansion spacer ring 43. The advantages of both rings is apparent from an examination of the relative diameters of the spigots 26, 24 and shaft portions 38, 40, thereby allowing the rotor 18 to be slipped axially aftward following removal of the axial securing nut 32. In the FIG. 1 embodiment, the first spacer ring 42 remains secured to the shaft 28 and the second spacer ring 43 remains secured to the second spigot 26 as the rotor 18 is removed.

It will be further appreciated that although shown and described in terms of radially concentric, substantially cylindrical surfaces and spigots 24, 26, 38, 40, the spacer rings 42, 43 according to the present invention are equally applicable to non-cylindrical, radially cooperating surfaces having regular or irregular radial cross-sections, including axially tapering rotor and shaft interfaces. Likewise, although disclosed in terms of a rotor and shaft assembly wherein the operating temperature is elevated with respect to ambient temperature, the spacer rings according to the present invention would be equally applicable in an arrangement wherein the operating temperature of the assembly components is lower than ambient temperature, such as in a cryogenic pump. Such reduced temperature operation of course requires inversion of the thermal coefficients of expansion of the materials of the first and second embodiment spacer rings so as to provide the desired shrinkage rate as the rotor and shaft assembly is cooled to operating temperature. Thus, the scope of the present invention includes a wide variety of equivalent configurations and is shown and described hereinabove in merely an illustrative, and not a limiting sense.

We claim:

1. A rotor assembly adapted for operation at elevated temperatures, comprising:
   a generally cylindrical, elongated shaft rotatable about a longitudinal shaft axis,
   a rotor having a hub portion and a disk portion, the hub portion disposed about the shaft and the disk portion extending radially outward with respect to the shaft axis, the shaft and rotor each having a corresponding overall thermal coefficient of expansion,
   an annular spacer, disposed radially between the rotor hub and the shaft, the spacer having an overall thermal coefficient of expansion significantly higher than the coefficients of the hub and the shaft,
   wherein the annular spacer is sized to achieve an interference fit radially between the shaft and the spacer inner diameter, and
   wherein the spacer outer diameter is sized to fit closely and to slide axially within the hub at ambient temperature.

2. A rotor assembly adapted for operation at elevated temperatures, comprising:
   a generally cylindrical, elongated shaft rotatable about a longitudinal shaft axis,
   a rotor having a hub portion and a disk portion, the hub portion disposed about the shaft and the disk portion extending radially outward with respect to the shaft axis, the shaft and rotor each having a corresponding overall thermal coefficient of expansion,
   an annular spacer disposed radially between the rotor hub and the shaft, the spacer having an overall thermal coefficient of expansion significantly lower than the coefficients of the hub and the shaft,
   wherein the annular spacer is sized to achieve an interference fit between the hub and the spacer outer diameter, and
   wherein the spacer inner diameter is sized to fit closely and to slide axially over the shaft at ambient temperature.

3. The rotor assembly as recited in claim 1, wherein the thermal coefficient of expansion of the spacer ring differs from the thermal coefficients of expansion of the shaft and the rotor by at least thirty percent.

4. The rotor assembly as recited in claim 2, wherein the thermal coefficient of expansion of the annular spacer differs from the thermal coefficients of expansion of the shaft and the rotor by at least 30%.

5. A rotor assembly adapted for operation at elevated temperatures, comprising:
   a generally cylindrical, elongated shaft rotatable about a longitudinal shaft axis, wherein the shaft is fabricated from a first material consisting essentially of steel,
   a rotor having a hub portion and a disk portion, the hub portion disposed about the shaft and the disk portion extending radially outward with respect to the shaft axis, wherein the rotor is fabricated to a second material consisting essentially of Waspaloy,
   wherein the shaft and rotor each have a corresponding overall thermal coefficient of expansion,
   an annular spacer disposed radially between the rotor hub and the shaft, the spacer having an overall thermal coefficient of expansion significantly greater than the coefficients of the hub and the shaft, wherein the annular spacer is fabricated of a third material consisting essentially of high expansion steel,
   wherein the annular spacer is sized to achieve an interference fit radially between the shaft and the spacer inner diameter, and
   wherein the spacer outer diameter is sized to fit closely and to slide axially within the hub at ambient temperature.

6. A rotor assembly adapted for operation at elevated temperatures, comprising:
   a generally cylindrical, elongated shaft rotatable about a longitudinal shaft axis, wherein the shaft is fabricated of a first material consisting essentially of steel,
   a rotor having a hub portion and a disk portion, the hub portion disposed about the shaft and the disk portion extending radially outward with respect to the shaft axis, wherein the rotor is fabricated of a second material consisting essentially of Waspaloy,
   wherein the shaft and rotor each have a corresponding overall thermal coefficient of expansion,
   an annular spacer disposed radially between the hub and the shaft, the spacer having an overall thermal coefficient of expansion significantly lower than the coefficients of the hub and the shaft wherein the annular spacer is fabricated of a third material consisting essentially of titanium,
   wherein the annular spacer is sized to achieve an interference fit radially between the hub and the spacer outer diameter, and
   wherein the annular spacer inner diameter is sized to fit closely and to slide axially over the shaft at ambient temperature.

* * * * *